(12) United States Patent
Olvera-Hernandez

(10) Patent No.: US 7,035,638 B2
(45) Date of Patent: Apr. 25, 2006

(54) METHOD AND APPARATUS FOR ENHANCED SHORT MESSAGE SERVICE

(75) Inventor: Ulises Olvera-Hernandez, Kirkland (CA)

(73) Assignee: Telefonktiebolaget LM Ericsson (publ), Stockholm (SE)

( * ) Notice: Subject to any disclaimer, the term of this patent is extended or adjusted under 35 U.S.C. 154(b) by 63 days.

(21) Appl. No.: 10/333,234

(22) PCT Filed: Jun. 8, 2001

(86) PCT No.: PCT/SE01/01315

§ 371 (c)(1),
(2), (4) Date: Sep. 26, 2003

(87) PCT Pub. No.: WO02/09460

PCT Pub. Date: Jan. 31, 2002

(65) Prior Publication Data

US 2004/0048627 A1 Mar. 11, 2004

(30) Foreign Application Priority Data

Jul. 21, 2000 (SE) .................................. 0002766

(51) Int. Cl.
*H04Q 7/20* (2006.01)
(52) U.S. Cl. .................. 455/435.3; 455/450; 455/466; 713/168
(58) Field of Classification Search ............. 455/466, 455/435.3, 450; 713/168, 163
See application file for complete search history.

(56) References Cited

U.S. PATENT DOCUMENTS

| | | | | |
|---|---|---|---|---|
| 5,603,081 A | * | 2/1997 | Raith et al. | 455/435.3 |
| 5,678,179 A | * | 10/1997 | Turcotte et al. | 455/466 |
| 6,189,098 B1 | * | 2/2001 | Kaliski, Jr. | 713/168 |
| 6,778,834 B1 | * | 8/2004 | Laitinen et al. | 455/450 |

FOREIGN PATENT DOCUMENTS

| | | |
|---|---|---|
| WO | WO 97/01940 | 1/1997 |
| WO | WO 99/49679 | 9/1999 |
| WO | WO 99/51048 | 10/1999 |
| WO | WO 00/33278 | 6/2000 |

* cited by examiner

*Primary Examiner*—William D. Cumming

(57) ABSTRACT

The present invention relates generally to mobile communication systems, methods and apparatus for transmitting messages from an originating party to a receiving mobile station, and transmitting short message service (SMS) messages from an originating party to a receiving mobile station in a mobile communication system. Briefly, the present invention solves a problem by transmitting both a message and a validity period (401) associated with the message from the message center to the receiving mobile station. By transmitting both a message and a validity period (401), associated with the message, where the validity period (401) specified by the sender of the message, the receiving mobile station can use the validity period (610) information when making decisions on how to process the received message.

17 Claims, 5 Drawing Sheets

METHOD AND APPARATUS FOR ENHANCED SHORT MESSAGE SERVICE

This application claims the benefit of the filing date of Swedish patent application number 0002766-4 filed on Jul. 21, 2000 and PCT application number PCT/SE01/01315 filed on Jun. 8, 2001.

TECHNICAL FIELD OF THE INVENTION

The present invention relates generally to mobile communication systems, methods and apparatus for transmitting messages from an originating party to a receiving mobile station, and specifically to transmitting short message service (SMS) messages from an originating party to a receiving mobile station in a mobile communication system.

DESCRIPTION OF RELATED ART

Radiocommunication systems, such as cellular systems, support a plurality of different communication services. The most commonly recognized and widely used communication service relates to handling voice communications to and from the mobile stations of cellular subscribers. Cellular systems may further support e.g. asynchronous data communications, facsimile communications and short message service (SMS). The short message service (SMS) provides for the transmission of messages having up to a limited number of alphanumeric characters to be sent to a subscriber at his or her remote unit.

When sending SMS messages to and from a mobile station, a message center, which stores and forwards the SMS messages, is used. It should be noted that SMS messages can be sent from a computer connected to the Internet. Further an e-mail (electronic mail) can be sent to a mobile station, but then it is converted to an SMS message.

When transmitting an SMS message to a receiving mobile station (MS), radio base stations (RBSs), and mobile switching centers (MSCs), are also involved beside the message centers. The communication between the MSCs and message centers is handled by different network interfaces such as TIA/EIA-41. The communication between MSC/RBS and mobile stations is handled by different air interfaces such as TIA/EIA-136. For a cellular system conforming to TIA/EIA-136, the SMS message is transmitted between an MSC and a mobile station on a Digital Control Channel (DCCH) or Digital Traffic Channel (DTC) inside a layer 3 R-DATA message. The SMS message is encapsulated into a User Data Unit of a SMS SUBMIT message from an originating party transmitting the message to the MSC and message center. The SMS message is encapsulated into a User Data Unit of a SMS DELIVER message when submitted to the receiving mobile station, from the corresponding message center and MSC of the receiving mobile station.

The sender of an SMS message could today specify a validity period of the message. This information is used by the message center to determine for how long the message center should continue to try and forward the message to the receiving mobile station, e.g. if the receiving mobile station is switched off.

It is possible however that despite the message center managed to send a specific message within the validity period, the validity period of the message expires while the message is in the receiving mobile station memory before the receiver reads it.

SUMMARY OF THE INVENTION

The problem dealt with by the present invention is providing a more flexible processing of messages at a receiving mobile station.

One exemplary scenario is that a message that has been delivered to the receiving mobile station becomes overdue and still remains in the receiver's mobile station memory. For someone that receives several messages a day, having useless messages stored in his/her mobile station is inconvenient. It might result in that some important messages in the memory needs to be erased due to lack of space in the memory when a new message is received or that the new message is never saved. Therefore, important messages may never be saved or older interesting messages may be deleted before they have been read.

Briefly, the present invention solves said problem by transmitting both a message and a validity period associated with the message from the message center to the receiving mobile station.

By transmitting both a message and a validity period associated with the message, where the validity period is specified by the sender of the message, the receiving mobile station can use the validity period information when making decisions on how to process the received message.

An object of the invention is to enable a more flexible way of processing messages at a receiving mobile station.

Another object of the invention is to offer the receiver of a message a choice of determining how overdue messages should be processed.

An advantage of the present invention is enabling more flexible processing of messages at a receiving mobile station.

A further advantage of the present invention is that the receiver of a message has the choice of determining how overdue messages should be processed, thereby memory space in the mobile station could be used for more important messages.

Another advantage of the present invention is the possibility to use the validity period in a second memory, which could be an external memory from the mobile station such as e.g. a digital calendar. Functions can be included in the calendar as to sort messages after their validity period or to make the user of the calendar aware of an important message before the validity period of the message has expired.

Still an advantage is that the invention makes it possible for the message center to transmit the messages regardless of the contents in the field validity period. Instead of as today when the message center is deleting all overdue messages in the message center according to the validity period. Then the user of the receiving mobile station is increasing his/her control of what to do with his/her messages. It can be optional of course to let the message center delete overdue messages according to the validity period or to transmit regardless, still the messages transmitted in time to the mobile station can be processed in accordance with the preferences set by the user.

Other objects, advantages and novel features of the invention will become apparent from the following detailed description of the invention when considered in conjunction with the accompanying drawings and claims.

DESCRIPTION OF PREFERRED EMBODIMENTS

Figure 1:
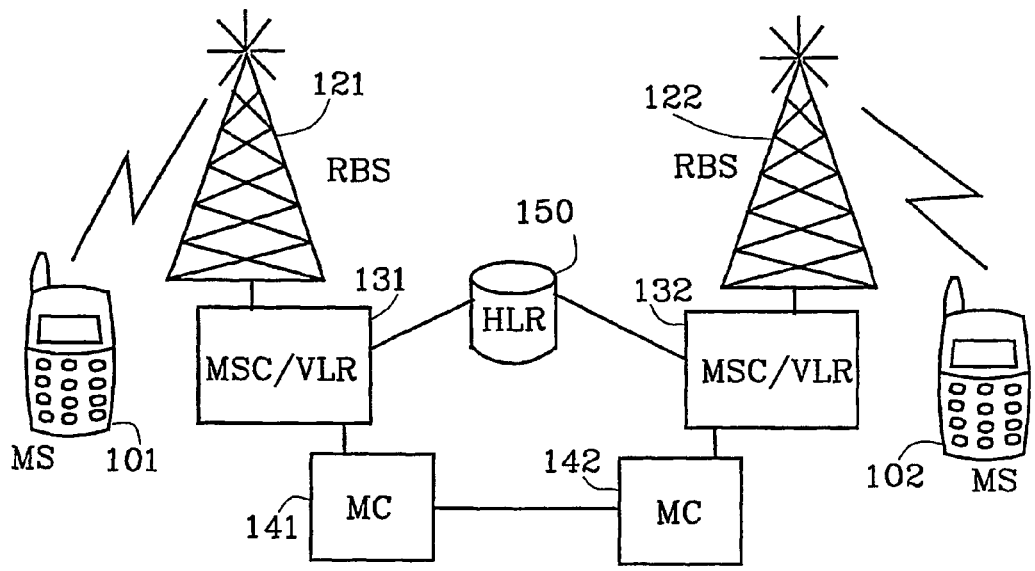
FIG. 1 is a block diagram illustrating a mobile telecommunication system including two mobile stations.

FIG. 1 shows part of a mobile communication system 10, including a cellular network and mobile stations, which apart from the normal speech and data communication is capable of transmission of SMS (short message service) messages. In the network according to FIG. 1 there are two mobile switching centers (MSCs) 131 and 132, each MSC is connected to a corresponding radio base station (RBS) 121 and 122. A sending mobile station 101 intends to transmit a message to a receiving mobile station 102, via the respective MSCs 131 and 132. For this purpose, there are also in the system two message centers 141 and 142 corresponding to the MSCs 131 and 132, in which messages are stored before a message is delivered to a recipient, e.g. the receiving mobile station 102.

In general a network, such as a cellular network conforming to the TIA/EIA-136 and TIA/EIA-41 specification, is composed of a plurality of areas, each area being served by an MSC having an integrated visitor location register (VLR), see MSC/VLR 131 and 132 in FIG. 1. The MSC/VLR areas, in turn, include a plurality of location areas (LAs), which are defined as a part of a given MSC/VLR area in which a mobile station may move freely without having to send update location information to the MSC/VLR that controls the location area. Each location area is divided into a number of cells.

The RBS is the physical equipment, illustrated for simplicity as a radio tower 121 and 122 in FIG. 1, that provides radio coverage to the cell it is serving.

The VLR is a database containing information about all of the mobile stations currently located within the MSC/VLR area. If a mobile station roams into a new MSC/VLR area, the VLR connected to that MSC will request data about that mobile station from the home location register (HLR) database 150, simultaneously informing the HLR 150 about the current location of the mobile station. Accordingly, if the user of the mobile station then wants to make a call, the local VLR will have the requisite identification information without having to reinterrogate the HLR 150. In the aforedescribed manner, the VLR and HLR 150 databases, respectively, contain various subscriber informations associated with a given mobile station.

The HLR 150 maintains all subscriber information, e.g., user profiles, current location information, international mobile subscriber identity (IMSI) numbers, and other administrative information. It may be co-located with a given MSC, integrated with the MSC, or alternatively service multiple MSCs, the latter of which is illustrated in FIG. 1.

Figure 2:
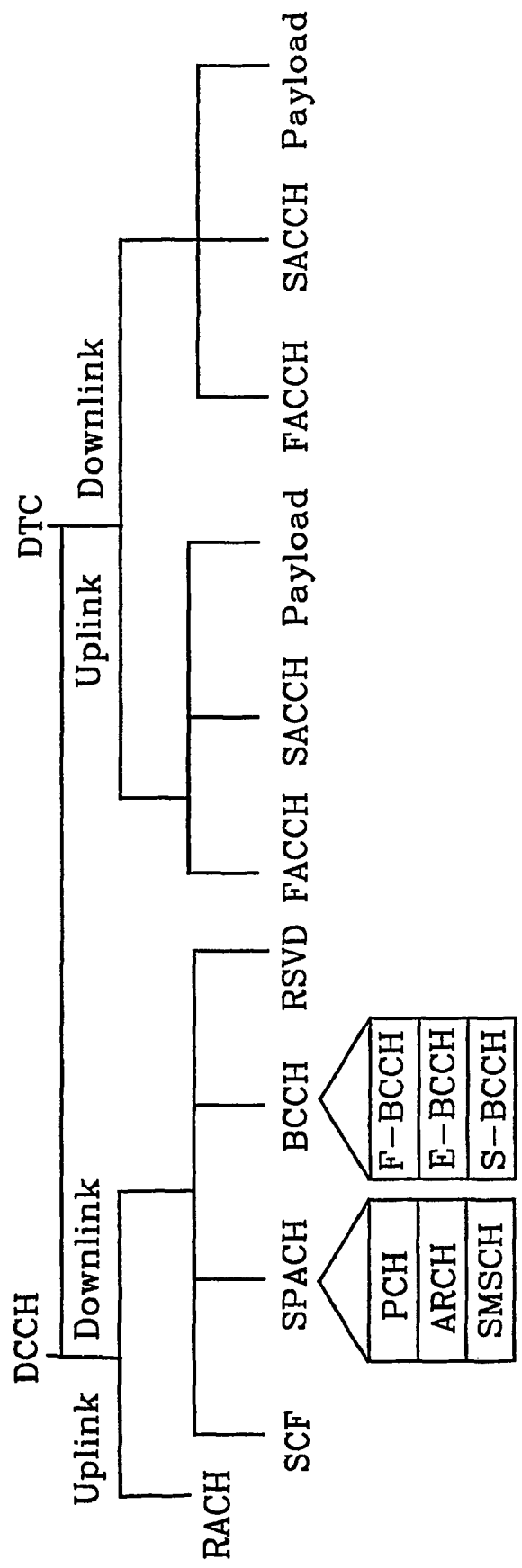
FIG. 2 is a block diagram illustrating layer 2 subchannels of the digital control channel DCCH and the digital traffic channel DTC.

FIG. 2 is an overview of the layer 2 subchannels of the Digital Control Channel (DCCH) and Digital Traffic Channel (DTC) used in the present system and also for the SMS service as shown in FIG. 1.

The layer 2 functionality supported in TIA/EIA-136 reflects the operational requirements of the subchannels that make up the DCCH and the DTC. As a result of the differences in subchannel requirements, distinct layer 2 protocols have been specified for the major subchannel groupings as shown in FIG. 2.

The SPACH logical channel in DCCH is used to broadcast information to specific mobile stations regarding SMS Point-to-Point (SMSCH), paging (PCH) and to provide an access response channel (ARCH).

On the DTC, the logical channels that are used for SMS transport can be either the FACCH (Fast Associated Control Channel) or the SACCH (Slow Associated Control Channel).

Figure 3:
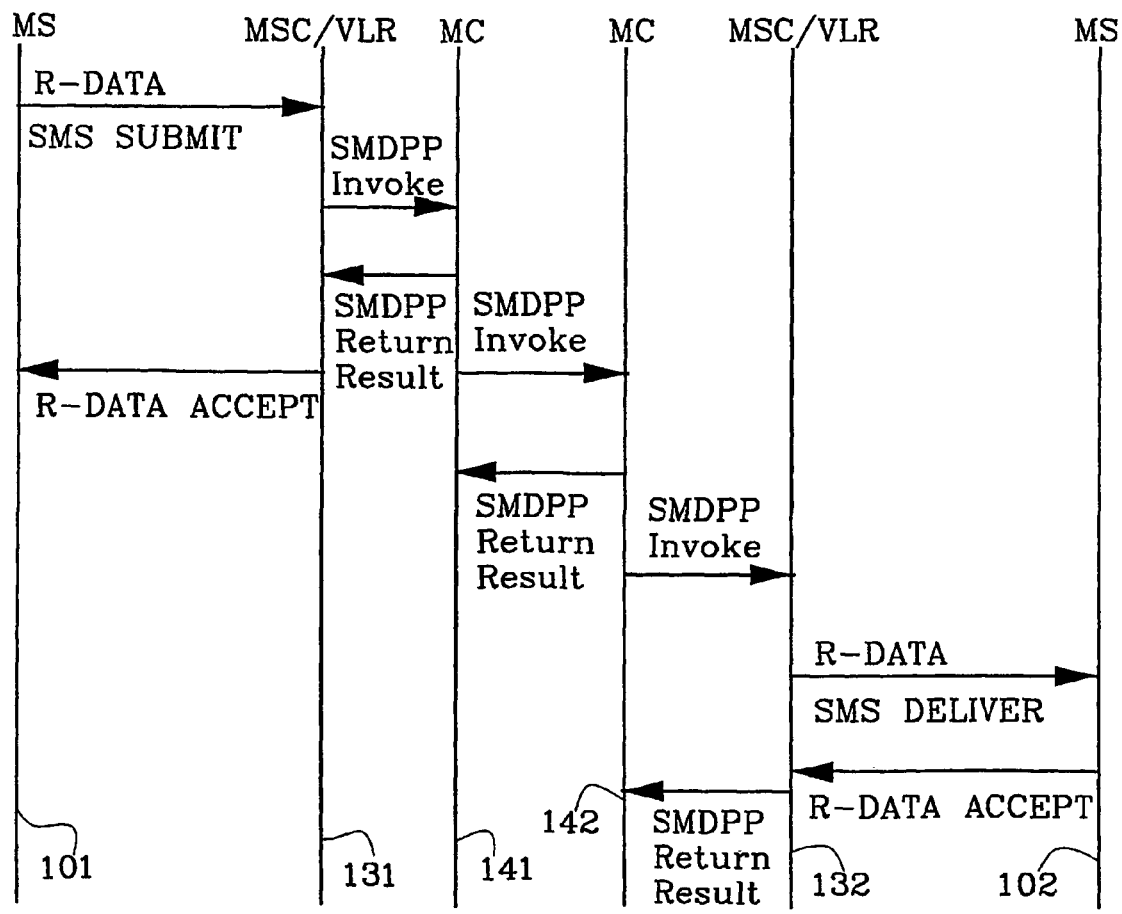
FIG. 3 is a signal diagram illustrating a message flow from a sending mobile station to a receiving mobile station.

A teleservice message, such as a SMS DELIVER or SMS SUBMIT message including a SMS message is delivered across the TIA/EIA-136 air interface on a DCCH or DTC inside a layer 3 R-DATA message, and across the TIA/EIA-41 network interface inside a layer 3 Short Message Delivery Point-to-Point SMDPP Invoke message (see FIG. 3). The delivery of the layer 3 message may be acknowledged by the destination in a TIA/EIA-136 R-DATA ACCEPT or R-DATA REJECT message and a TIA/EIA-41 SMDPP Return Result message (see FIG. 3).

In describing how an SMS message is sent from a sending mobile station 101 to a receiving mobile station 102 (in FIG. 1), sending mobile station 101 first establishes a connection to the network (serving MSC/VLR 131), via an allocated digital control channel (DCCH. However, it should be noted that if sending mobile station 101 is in busy mode (in use), a connection already exists and the SMS message will be transmitted on the digital traffic channel (DTC) already in use for the existing call. It is also possible to set up a DTC specifically just to send and SMS. MSC/VLR 131 corresponding to the sending mobile station 101, transmits the message to the sending mobile station's message center 141. Thereafter, this message center 141 sends the message to the receiving mobile station's message center 142. Then the receiving mobile's message center 142 asks the HLR for routing information regarding the receiving mobile station 102. The HLR returns routing information to the receiving mobile's message center 142, which then routes the message to the MSC/VLR 132. The mobile station 102 is paged in that MSC/VLR-area, a connection is set-up between the network and the mobile station 102, and the message is sent from the network to the mobile station 102.

As a person skilled in the art appreciates, a single message center 141 or 142, in FIG. 1, may serve both sending and receiving mobile stations 101 and 102, as long as the mobile stations belong to the same message center. It is in no way limited to be different message centers 141 or 142 for different mobile stations 101 and 102, as described in the section above.

The MSC provides the interworking between the message center and the mobile station by translating between the TIA/EIA-136 and TIA/EIA-41 protocols.

If the delivery was unsuccessful, e.g. because the receiving mobile station 102 was switched off, a messages waiting service within the message center 142 can optionally provide the HLR and the serving MSC/VLR 132 with the information that there is a message in the message center 142 waiting to be delivered to the receiving mobile station 102. Once the receiving mobile station 102 becomes available for receipt of the SMS message, the HLR 150 informs the message center 142 and the SMS message is sent again.

Figure 4:
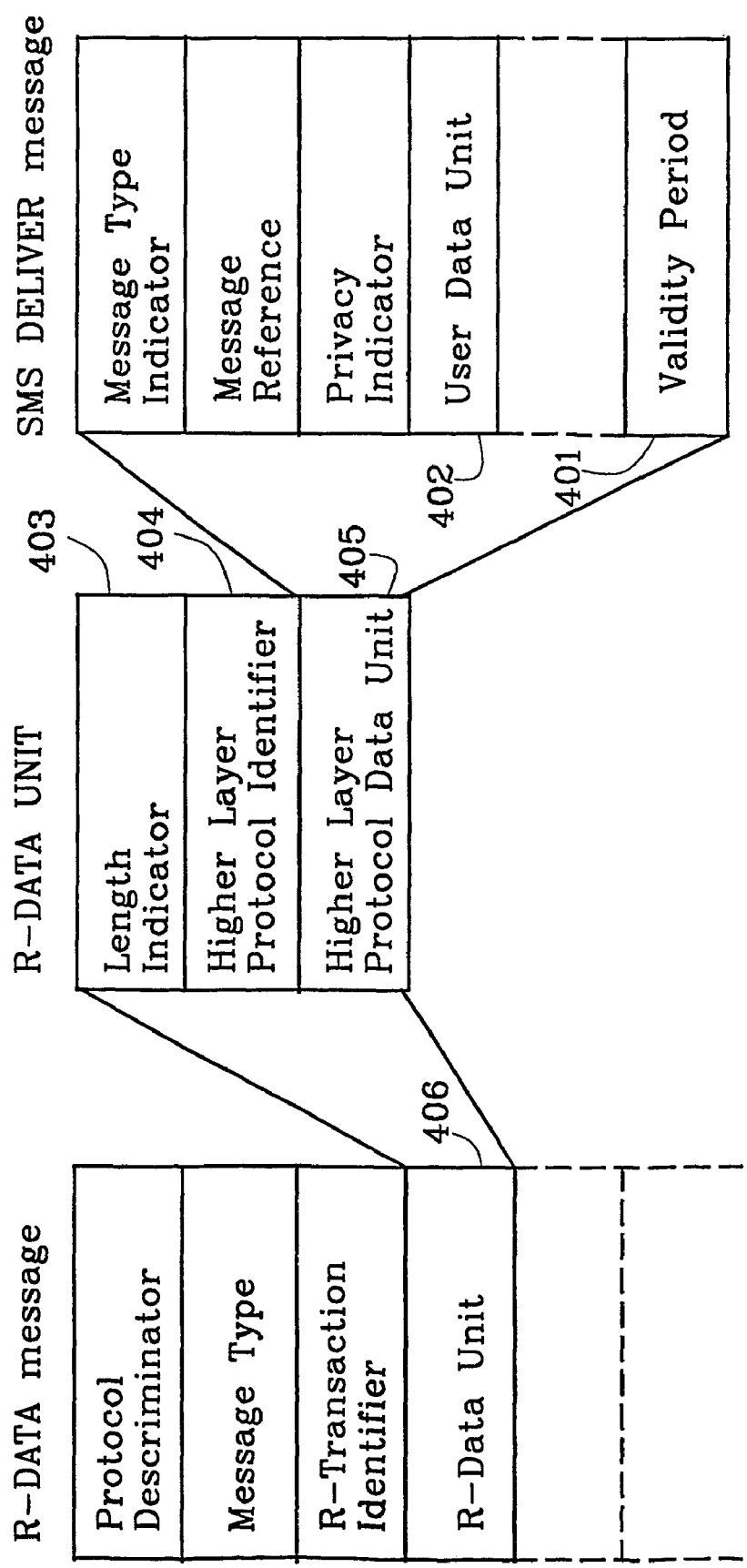
FIG. 4 is a schematic representation illustrating a transmission protocol when sending a SMS DELIVER message according to the invention.

An example message flow for SMS sent from one mobile station to another mobile station is illustrated in FIG. 3. The SMS message from sending mobile station 101 is encapsulated into the User Data Unit of the SMS SUBMIT message. The SMS SUBMIT message is delivered to the cellular network in an R-DATA message on either the DCCH or the DTC in FIG. 2. The R-DATA message, in FIG. 4, is translated into an SMDPP Invoke message by the MSC 131 serving sending mobile station 101 and delivered to the message center 141 serving sending mobile station 101. The message center 141 serving sending mobile station 101 sends an acknowledgement in the form of an SMDPP Return Result message to the MSC 131. The MSC 131 in turn sends out an R-DATA ACCEPT message to the sending mobile station 101 to indicate that the message has been received by the MSC 131. The message center 141 serving sending mobile station 101 routes the SMS message to the message center 142 in an SMDPP Invoke message. The message center 142 acknowledges the received SMDPP Invoke message with a SMDPP Return Result message to the message center 141 serving sending mobile station 101. An SMDPP Invoke message containing the SMS message for receiving mobile station 102 in an SMS DELIVER message is sent to an MSC 132 serving receiving mobile station 102 by the message center 142. The MSC 132 then translates the SMDPP Invoke message into a R-DATA message and sends it to receiving mobile station 102 which in turn acknowledges the receipt of the R-DATA message with an R-DATA ACCEPT. The MSC 132 then sends an SMDPP Return Result message to the message center 142 as an acknowledgement of the SMS message delivery to receiving mobile station 102. This step completes the routing of the SMS message from mobile station 101 to mobile station 102 through the R-DATA and SMDPP Invoke messages.

The sender of a SMS message can today associate the message with a validity period 610 (see FIG. 6) that in that case will be transferred in a validity period field 610 in the SMS SUBMIT message to the message center 141/142. In the message center 142 the SMS message will be deleted if the message is not delivered within the validity period 610 to the receiving mobile station 102. The reason why a SMS message may not be delivered in time could e.g., be that the receiving mobile station 102 is turned off.

One scenario is that a message 611 (see FIG. 6) that has been delivered to the receiving mobile station 102 becomes overdue and still remains in the receiver's mobile station first memory 601. For someone that receives several messages a day, having useless messages stored in his/her mobile station 102 is inconvenient. It might result in that some important messages in the first memory 601 needs to be erased due to lack of space in memory when a new message is received or that the new message is never saved. Therefore, important messages may never be saved or older interesting messages may be deleted before they have been read.

The present invention enables a more flexible way of processing a message at a receiving mobile station 102. In order to properly manage overdue messages, it is important to determine when they are overdue. This is possible if the validity period 610, set by the sender 101 and used in the message center 141/142, is passed to the receiving mobile station 102.

With a validity period field 401 included in the SMS DELIVER message together with SMS message (see FIG. 4), the validity period 610 information can be accessed in the receiving mobile station 102 and the user of the receiving mobile station 102 can use the information to decide if messages are overdue, and take actions on overdue messages. The user of the mobile station 102 can choose for example to delete overdue messages or to keep them in or forward them to a second memory 602/603. The messages 611 may be time specific, but the user of a mobile station 102 may anyway choose to keep a message 611 instead of deleting it or he/she may choose to delete a message 611 after a grace period. The user could further choose e.g. whether messages 611 should be conditionally erased to allow for the reception of higher priority messages or whether they should be erased, as soon as their validity period 610 is up. Another choice could be to forward the message 611 to a digital calendar 620 or another kind of storage 602/603 depending on the validity period 610.

According to one exemplary embodiment of the invention in a method for transmitting a message in a mobile communication system 10 from a originating party 101 to a receiving mobile station 102 the message 611 is first transmitted from the originating party 101 to a message center 141/142 where it is stored. Further, both the message 611 and associated validity period 610, are transmitted from the message center 141/142 to the receiving mobile station 102, and associated validity period 610 is being used in the receiving mobile station 102.

In this exemplary embodiment of a method according to the invention, the field validity period 610 in the SMS SUBMIT message will correspond to a new field validity period 401 of the SMS DELIVER message when the SMS message is transferred from the message center 141/142 to the receiving mobile station 102. Included in the SMS DELIVER message is also other fields of information elements (such as Message Type Indicator, Message Reference etc., see FIG. 4) plus the SMS message 611 included in the User Data Unit 402 (see TIA/EIA-136). The receiver can choose to deal with SMS messages that are forwarded to the receiving mobile station 102 in his/her way by using the validity period 610 sent in the validity period field 401.

The message center 141/142 is today deleting all SMS messages in the message center, which according to the validity period 610 are overdue. According to one alternative embodiment of the invention the SMS messages that become overdue when in the message center may instead of being deleted be transmitted to their destination regardless of their associated validity periods. This implies the choice of how to process the message is totally up to the receiver of the message, if he/she likes to use the information in the validity period field 610 or not. It can of course be optional to let the message center 141/142 delete messages that are overdue according to the validity period 610 or to transmit them regardless. If they are overdue or not the messages transmitted in time to the receiving mobile station 102 can still be processed, in accordance with the preferences set by the user of the receiving mobile station 102.

In the future it may be possible to include a validity period 610 also in SMS messages 611 originating from a WEB-page on the Internet or in e-mails converted to SMS messages.

The validity period 610 is provided in the validity period field 401 in either offset or integer form. In the first case, the validity period field 401 provides the length of the validity period 610, counted from when the SMS SUBMIT message is received by the message center 141/142. In the second case, the validity period 610 provides the absolute date and/or time of the validity period 610 termination. A Validity Period Format field indicates the format used to code the validity period 610.

How many alphanumeric characters that are allowed in a short message service (SMS) is limited by the message center that may have different maximum message length capability. The maximum message length is dependent on the implementation and can also be set by the system operators to optimize the system performance.

FIG. 4 illustrates generally the transmission protocol when sending R-DATA message according to the TIA/EIA-136 standard and how an SMS DELIVER message is created and transmitted as part of an R-DATA Unit 406 which in turn is part of an R-DATA message. The format of the R-DATA message is generally described in the TIA/EIA-136-123B 5.3.11.

The R-DATA Unit 406 comprises a Length Indicator 403, a Higher Layer Protocol Identifier 404 and a Higher Layer Protocol Data Unit 405. This Data Unit 405 includes the SMS DELIVER message. The SMS DELIVER message comprises a number of information elements including an User Data Unit field 402, containing the SMS message 611, being transmitted, a new Validity Period field 401, containing a validity period 610 associated with said SMS message 611.

Figure 5:
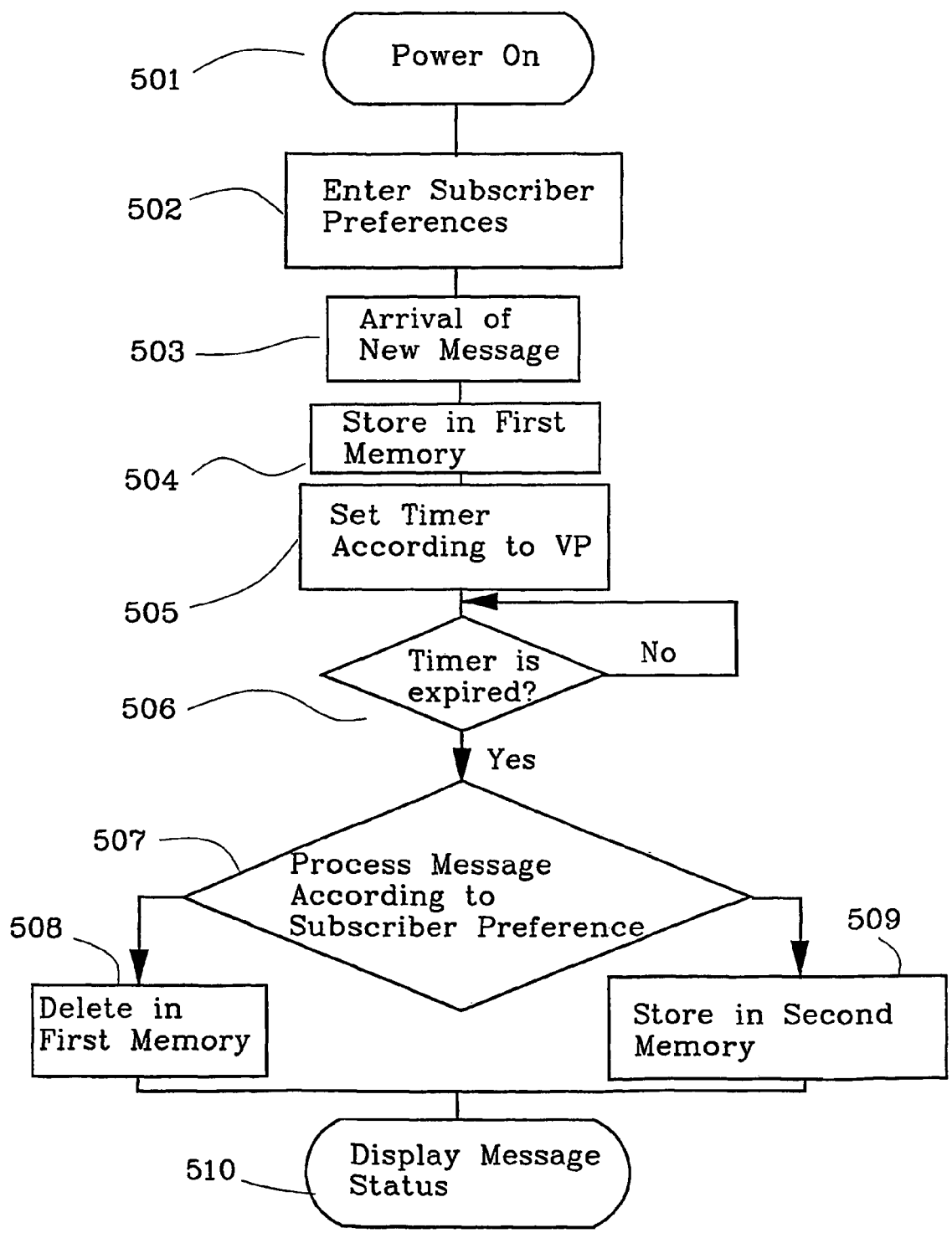
FIG. 5 is a flow chart illustrating a message management solution dependent on a validity period according to the invention.

FIG. 5 shows a flow chart of how an SMS message 611 and an associated validity period 610 are received and manipulated in the receiving mobile station in accordance with the receiver's preferences.

Once the user of the receiving mobile station 102 turns on 501 the receiving mobile station 102 he/she might enter preferences 502 such as whether a received message 611 should be stored in a first memory 601 until the associated validity period has expired, whether the user of the receiving mobile station 102 should be notified when the associated validity period 610 of a message 611 in the first memory 601 expires, whether the received message and the associated validity period 610 should be transferred 604/605 to a second memory 602/603, or deleted from the first memory 601 when the associated validity period 610 expires. The user of a receiving mobile station 102 might also specify whether a grace period should apply before the message is deleted from the first memory 601 and whether messages that are overdue (messages with an expired associated validity period 610) should be placed in a second memory 602 included in the receiving mobile station 102 or external 603 to the receiving mobile station 102.

Thus, when a message arrives 503, the message 611 and associated validity period 610 are stored 504 in a first memory 601 in the receiving mobile station 102. The receiving mobile station 102 extracts the associated validity period 610 if there is one provided and initiates a time supervision for that message by for example setting 505 a timer 606 in accordance with the associated validity period 610. When the timer expires (an alternative Yes at 506), the receiving mobile station 102 uses 507 the preferences set by the user of the receiving mobile 102 in order to determine whether for example the messages should be deleted 508 in first memory 601 or transferred 604/605 to a second memory 602/603 and deleted 508 from the first memory 601. In addition the receiving mobile station 102 might provide the user with the status of transferred and deleted messages by displaying 510 a suitable icon on its screen 607. The receiving mobile station 102 can include a notification function, which would notify the user of the receiving mobile station 102 when the message 611 with an associated validity period 610 expires. Alternatively the user of the receiving mobile station 102 could be notified some time before (set according to user preferences) the message expires. Depending on how much earlier the user wants to receive a notification. The receiving mobile station 102 should be able to provide a record of messages that have been erased comprising the sender's address, the validity period 610 and the degree of urgency.

Instead of using a timer 606 the current date and/or time could be registered when a new message 611 arrives at the receiving mobile station 102. If the message 611 has an associated validity period 610, said validity period is compared to the registered current date and time to find out if the validity period 610 has expired.

When the option is set by the user of the receiving mobile station 102 to store received new SMS messages 611 in a first memory 601 in the receiving mobile station 102, it is first necessary to control if there is enough available memory in the first memory 601 in the receiving mobile station 102 before storing the new received message. In case of a shortage of available memory, validity periods of the earlier stored messages are checked, and if a message is overdue, the overdue message is deleted to make space for the newly arrived message (the user of the receiving mobile station may even get a choice of reading the message that is going to be deleted before it is deleted if so is the option). This means that not more messages are deleted than is needed to make space for the newly received message. It may happen that there are messages which are not overdue but their validity periods are closer in time to become overdue than the newly arrived message 611 and there are not enough available memory in the first memory 601 of the receiving mobile station for saving the newly arrived message 611. At these moments there are different ways of processing the message such as always deleting the newly arrived message 611, deleting a message having a validity period that will expire first, transfer the newly arrived message 611 or the message having a validity period that will expire first to a second memory 602/603 etc. The second memory 602/603 can be a separate second memory 602 inside the receiving mobile station or an external separate second memory 603. Another solution is to frequently check the first memory 601 for overdue messages instead of each time a new message arrives. When a check is done in the first memory 601 for overdue messages, the associated validity period 610 is compared to the date and/or time when the check is executed. See further what is described above.

Figure 6:
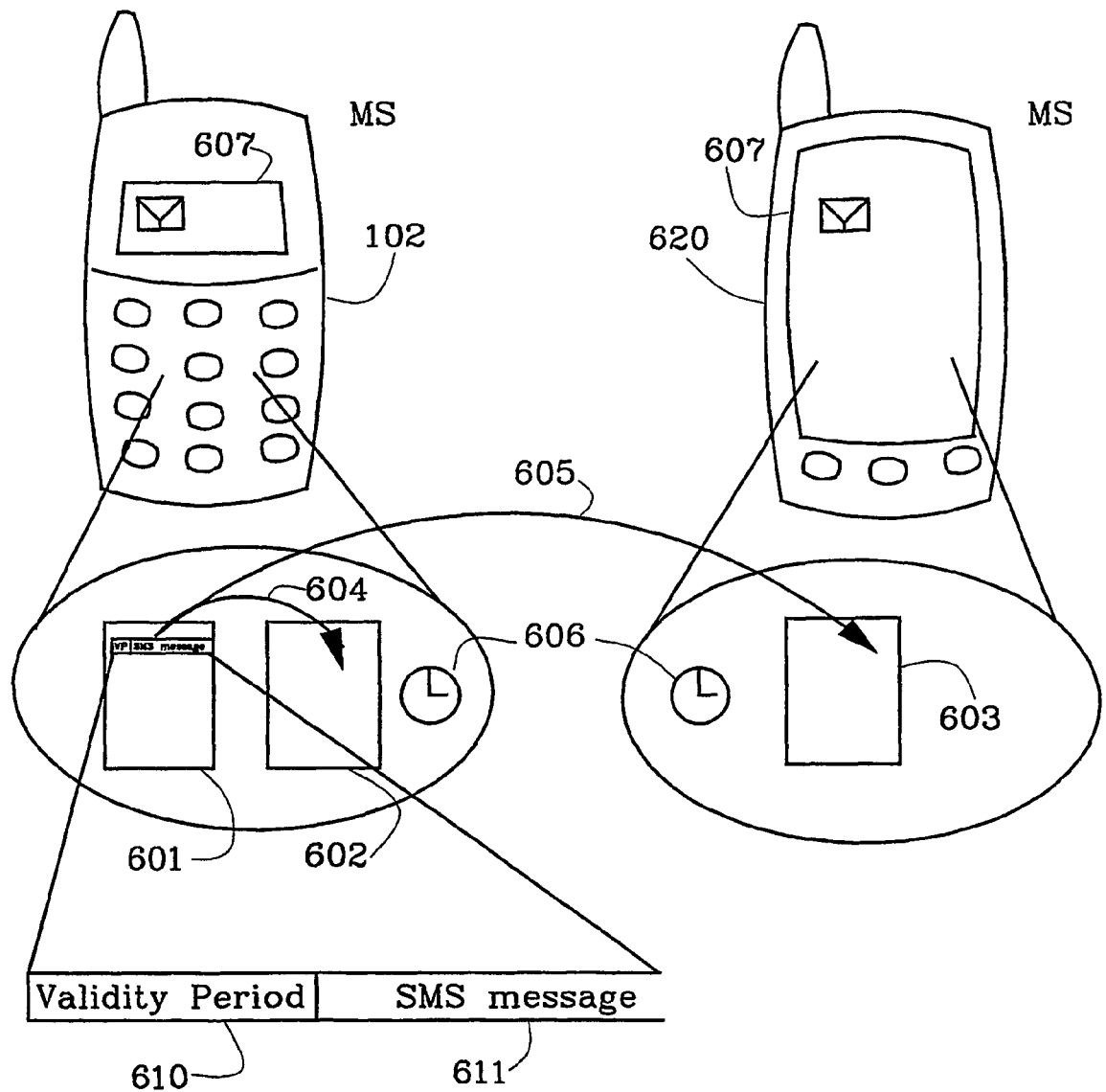
FIG. 6 is a block diagram illustrating two different embodiments of mobile stations according to the invention.

In FIG. 6 is a block diagram illustrating two different mobile stations 102/620 comprising memories 601/602/603, a timer means 606 and a display means 607. In the receiving mobile station 102 is included at least one first memory 601. There may also be a second memory 602, which is separate from the first memory 601. If the first memory 601 is full can according to preferences set by the user of the mobile station 102 the message 611 and associated validity period 610 be deleted from the first memory 601, and/or moved 604 to the second memory 602 inside the same receiving mobile station 102. The message 611 and associated validity period 610 can also be moved 605' to a second memory 603 included in another device such as e.g. a digital calendar 620. A receiving mobile station 102 can also include calendar functions. In one solution to a calendar function described in FIG. 5, is needed a timer means 606 in the receiving mobile station 102. To display the messages 611 a display means 607 is included in the receiving mobile station 102.

As a person skilled in the art appreciates, application of the invention is in no way limited to only radio communication systems conforming to the TIA/EIA-136 and TIA/EIA-41 specifications. The invention is on the contrary applicable in e.g. all systems which utilizes short messages services such as systems conforming to e.g., the GSM-, PDC-, IS-95-, UMTS- or DECT-specifications.

As will be recognized by those skilled in the art, the innovative concepts described in the present application can be modified and varied over a wide range of applications. Accordingly, the scope of patented subject matter should not be limited to any of the specific exemplary teachings discussed.

The invention claimed is:

1. A method for transmitting a message in a mobile communication system from an originating party to a receiving mobile station, wherein said mobile communication system includes a message center, and where a validity period is associated with said message, comprising the steps of:
   receiving a message from said originating party wherein said message includes a validity period,
   transmitting both said message and said associated validity period via said message center to said receiving mobile station.

2. A method according to claim 1, wherein if said message and said associated validity period have not been delivered to said receiving mobile station upon expiry of said validity period, the message is deleted by said message center.

3. A method according to claim 1, wherein said message center attempts to transmit said message and said associated validity period to said receiving mobile station even after expiry of said associated validity period.

4. A method according to claim 1, wherein said message and said associated validity period are transmitted in an SMS DELIVER message from said message center to said receiving mobile station.

5. A method according to claim 4, wherein said SMS DELIVER message is transported in a layer 3 R-DATA message.

6. A method according to claim 1, wherein said associated validity period is given in form of an expire time of said message.

7. A method according to claim 1, wherein said associated validity period is given in form of an offset time counted from when said message and said associated validity period are received by said message center.

8. A method according to claim 1, wherein after receipt of said message by said receiving mobile station, said message is processed according to predetermined rules and said validity period.

9. A method according to claim 8, wherein said predetermined rules are based on preferences set by a user of said receiving mobile station.

10. A method according to claim 9, wherein in accordance with said predetermined rules, said associated validity period is read and a time supervision is initiated in accordance with said associated validity period.

11. A method according to claim 10, wherein in accordance with said predetermined rules, said message and said associated validity period are transferred from a first memory to a second memory when said associated validity period has expired.

12. A method according to claim 10, wherein in accordance with said predetermined rules, said message and said associated validity period are deleted from a first memory when said associated validity period has expired.

13. A method according to claim 12, wherein a grace period is applied, before said message and said associated validity period are deleted from said first memory.

14. A mobile station comprising:
    means for receiving a message wherein said message includes an associated validity period, and
    a first memory for storing said message and said associated validity period until said associated validity period has expired.

15. A mobile station according to claim 14, wherein said mobile station further comprises a second memory, said message and said associated validity period are transferred from said first memory to said second memory when said associated validity period has expired.

16. A mobile station claim 14, wherein said message and said associated validity period are deleted from said first memory when said associated validity period has expired.

17. A mobile station according to claim 16, wherein a grace period is applied, before said message and said associated validity period are deleted from said first memory.

* * * * *